March 12, 1929.  F. M. LEWIS  1,704,861
DIFFERENTIAL MECHANISM
Filed Oct. 24, 1925   5 Sheets-Sheet 1
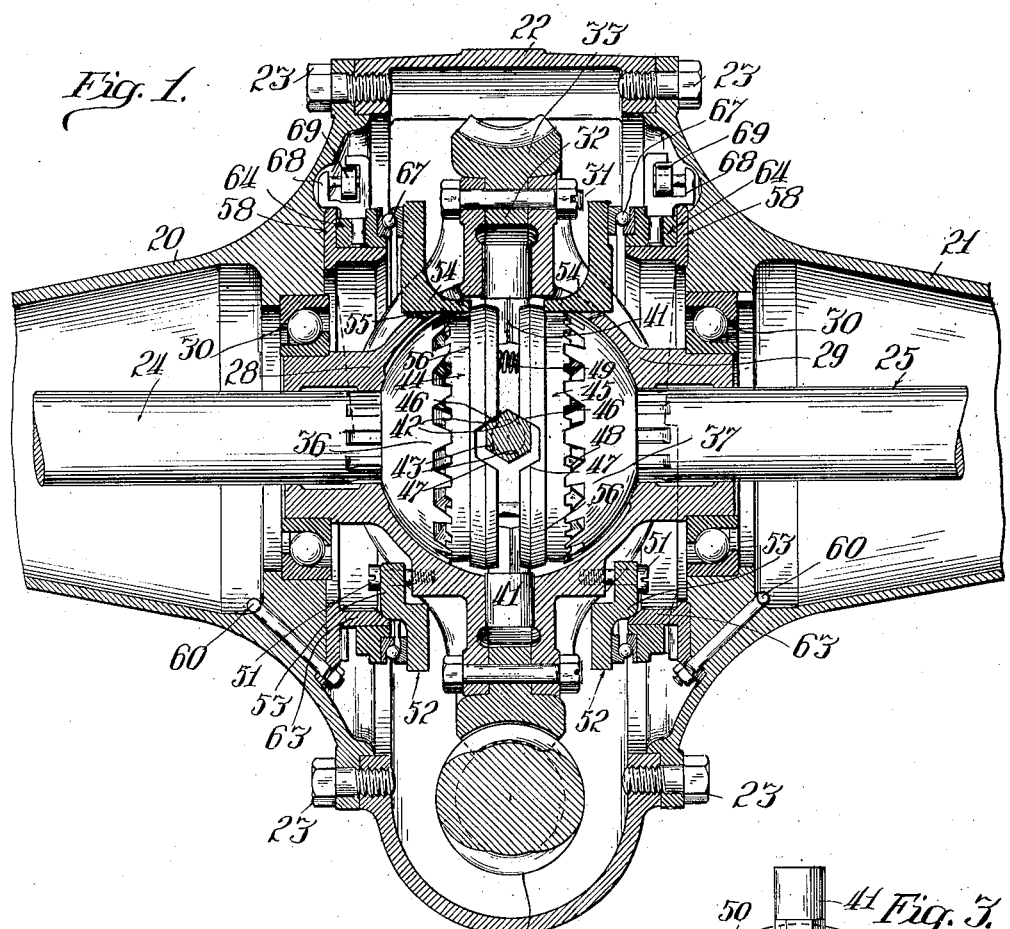
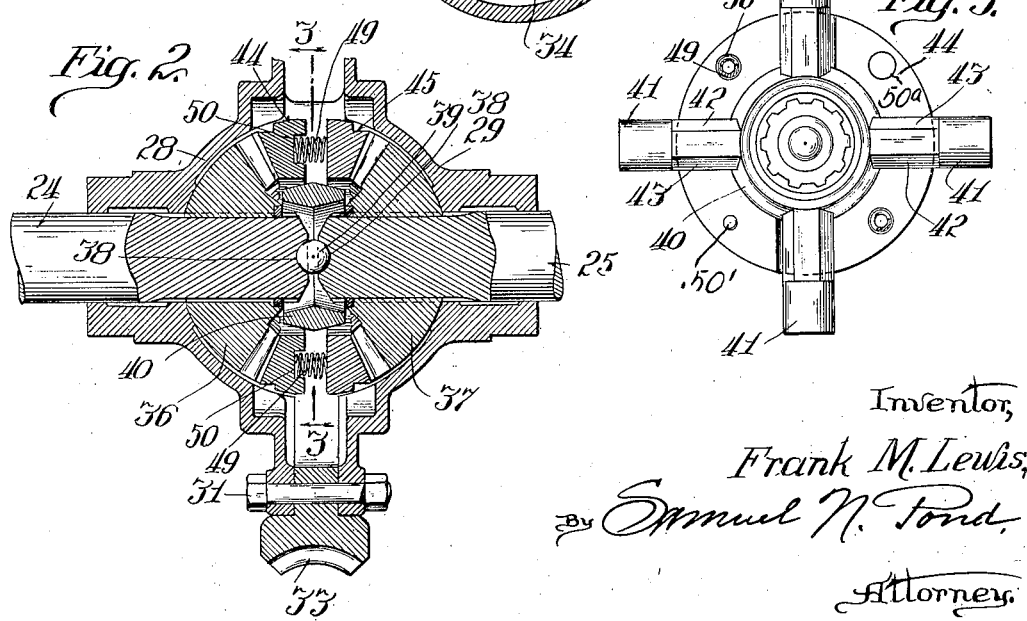
Inventor,
Frank M. Lewis,
By Samuel N. Pond,
Attorney.

March 12, 1929. F. M. LEWIS 1,704,861
DIFFERENTIAL MECHANISM
Filed Oct. 24, 1925   5 Sheets-Sheet 2
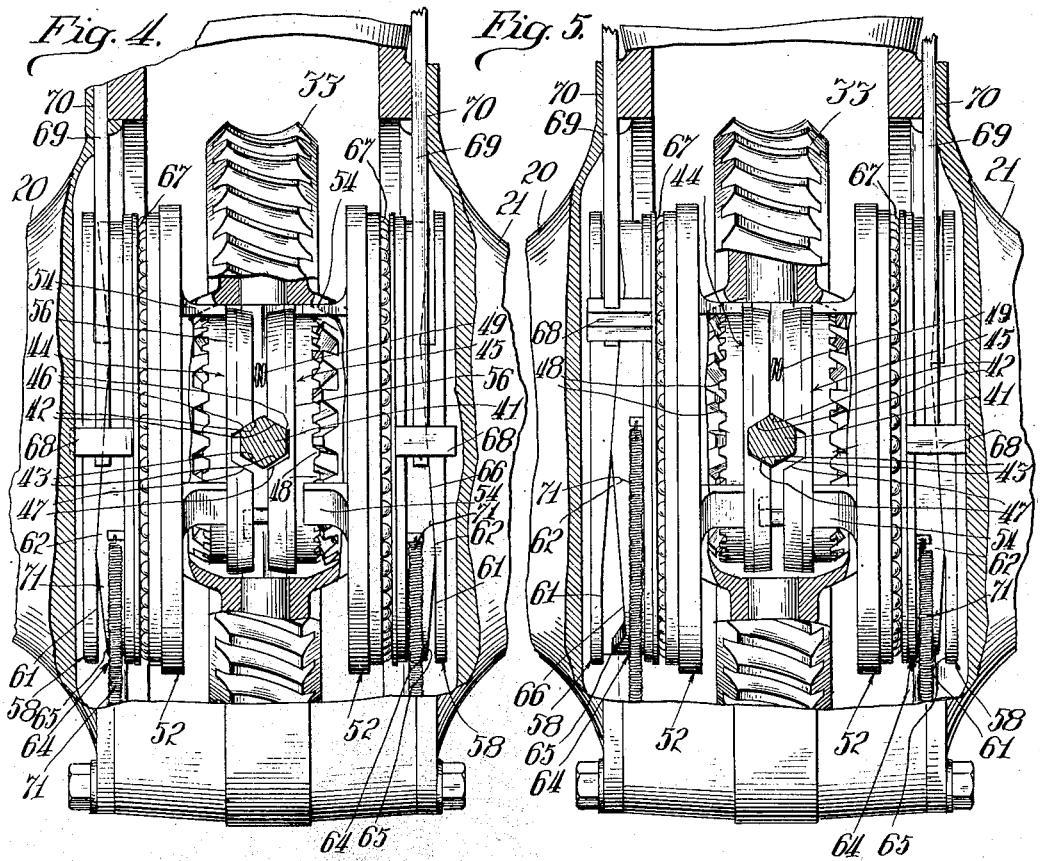
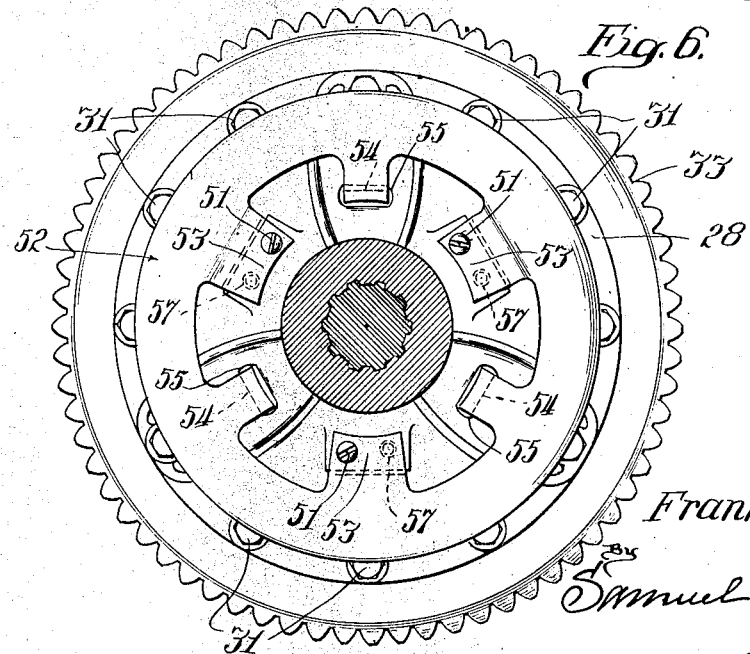
Inventor,
Frank M. Lewis,
By Samuel N. Pond,
Attorney.

March 12, 1929.   F. M. LEWIS   1,704,861
DIFFERENTIAL MECHANISM
Filed Oct. 24, 1925   5 Sheets-Sheet 3
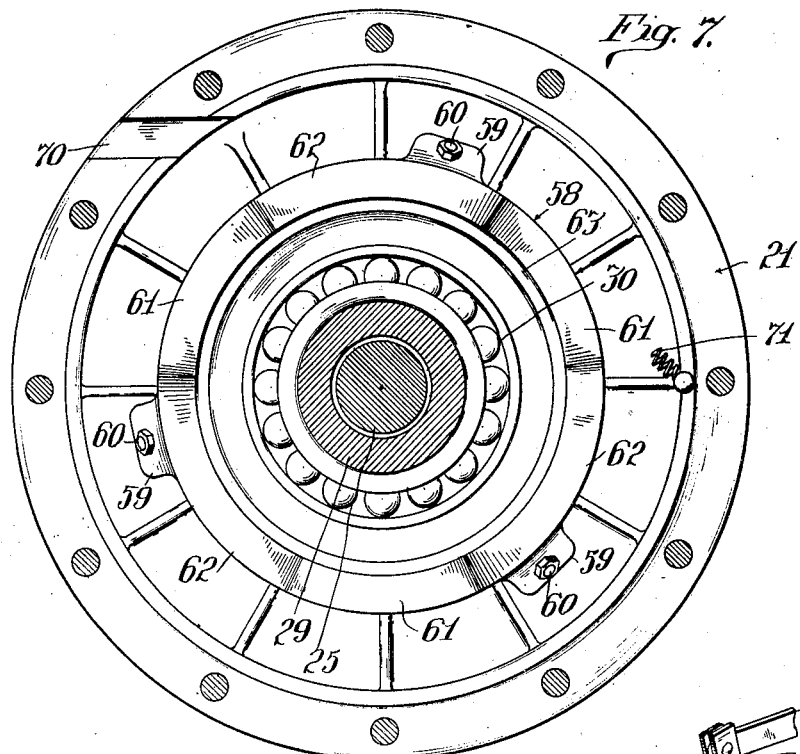
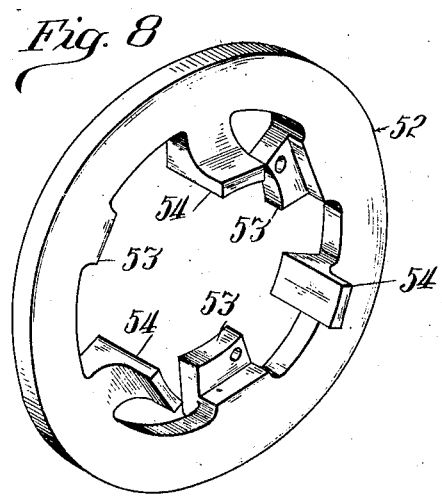
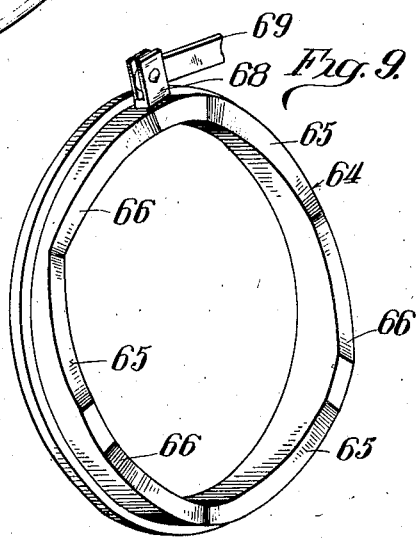
Inventor,
Frank M. Lewis,
By Samuel N. Pond,
Attorney.

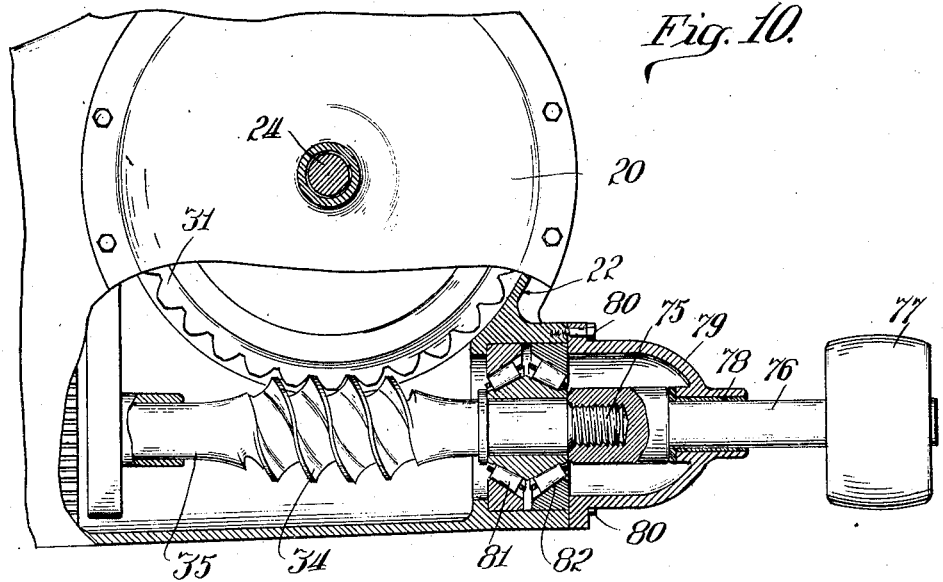
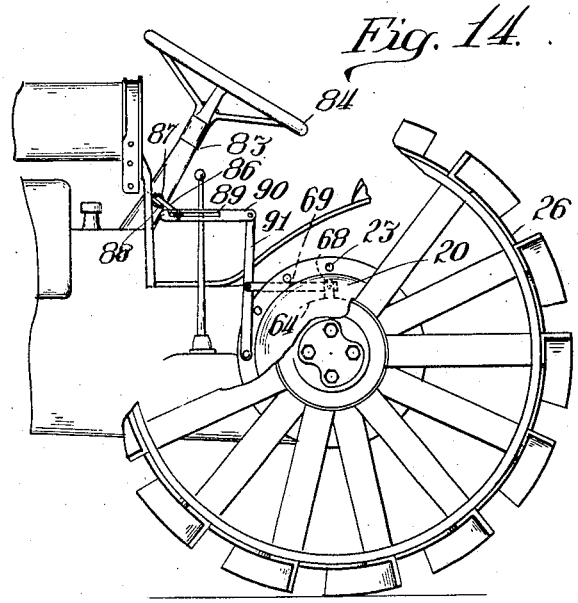
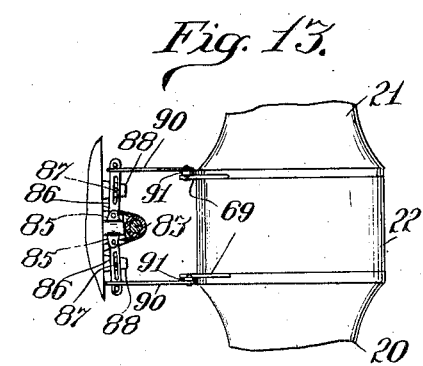

March 12, 1929.  F. M. LEWIS  1,704,861

DIFFERENTIAL MECHANISM

Filed Oct. 24, 1925   5 Sheets-Sheet 5

Inventor,
Frank M. Lewis,
By Samuel N. Pond,
Attorney

Patented Mar. 12, 1929.

1,704,861

UNITED STATES PATENT OFFICE.

FRANK M. LEWIS, OF CHICAGO, ILLINOIS.

DIFFERENTIAL MECHANISM.

Application filed October 24, 1925. Serial No. 64,496.

This invention relates to differential mechanism designed mainly for use on automobiles, trucks, tractors and other motor vehicles, and has reference more particularly to a differential mechanism of the self-locking type disclosed in former Letters Patent of the United States heretofore granted to me No. 1,292,818 dated January 28, 1919, and No. 1,430,744 dated October 3, 1922, and characterized by the provision of a pair of driven clutch members fast on the inner ends of the axle sections, a pair of laterally shiftable driving clutch members between said driven clutch members, a rotatable housing enclosing said driving and driven clutch members, and a driver having the general form of a spider mounted in said rotatable housing and having radial studs in driving engagement with the inner sides of said shiftable clutch members.

One object of my present invention is to provide an improved differential mechanism of the type referred to which shall afford a minimum of lost motion to effect the disengagement of the driven clutch members from their respective driving clutch members when the two axle sections are turning at different speeds. Another object of the invention is to provide a differential mechanism of the type referred to especially adaptable for use on tractors, and which will permit a turning movement of the tractor on either rear wheel as a pivotal center, or on an arc of which the rear axle forms the radius. In the embodiment of the invention for the last stated purpose, there is employed a throw-out which may be operated either manually or by power and by which either driving clutch member may be instantly disengaged from driving engagement with its co-operating driven clutch member, so that the entire driving force may be applied to one axle section and wheel, while the other axle section and wheel do not rotate but merely swing on the ground contact point of the wheel tread as a pivot. A further object of the invention is to provide an improved power take-off from the propeller shaft of the differential which may be operated while the tractor is stationary.

Other objects and attendant advantages of the invention will be apparent to persons skilled in the art as the same becomes better understood by reference to the following description, taken in connection with the accompanying drawings wherein I have illustrated one practical embodiment of the invention as applied to tractor use, and in which—

Fig. 1 is a vertical axial section, with the driving and driven clutch members appearing in elevation;

Fig. 2 is an axial section through the rotary housing, the driving and driven clutch members, the hub of the spider, and the inner ends of the axle sections;

Fig. 3 is a central transverse section on the line 3—3 of Fig. 2;

Figs. 4 and 5 are horizontal sections through the upper portion of the axle housing, showing the differential mechanism and throw-out mechanism therefor in top plan; Fig. 4 showing the left hand driving and driven clutch members engaged and the right hand driving and driven clutch members automatically disengaged under the camming action of the clutch teeth, and Fig. 5 showing said parts in reversed position, with the left hand members manually disengaged.

Figure 11:
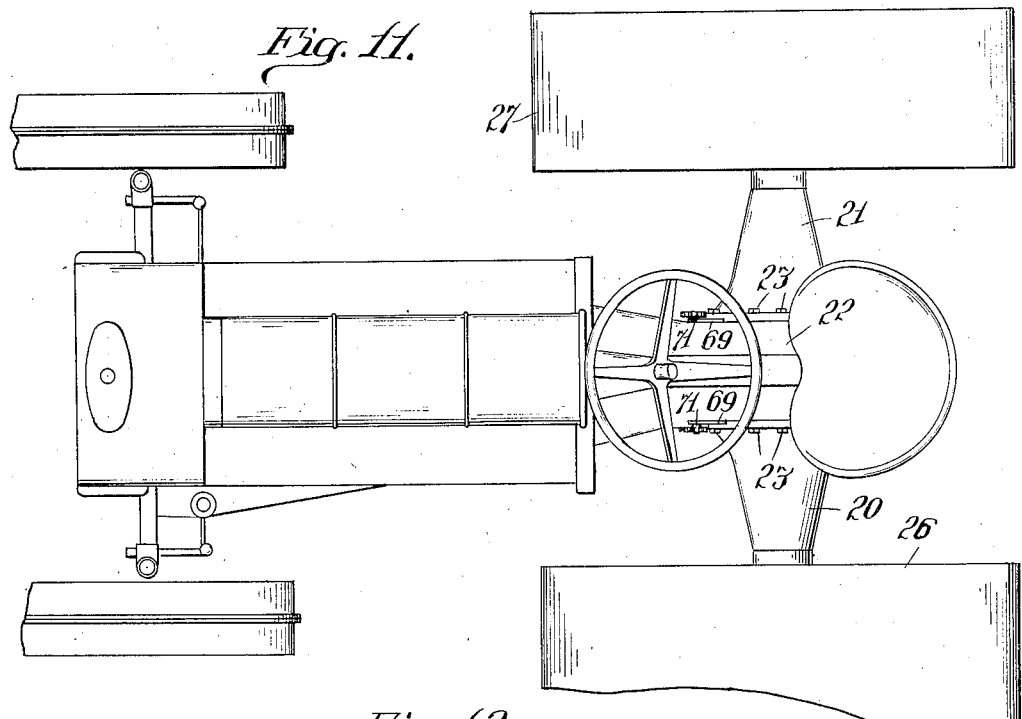
Figure 12:
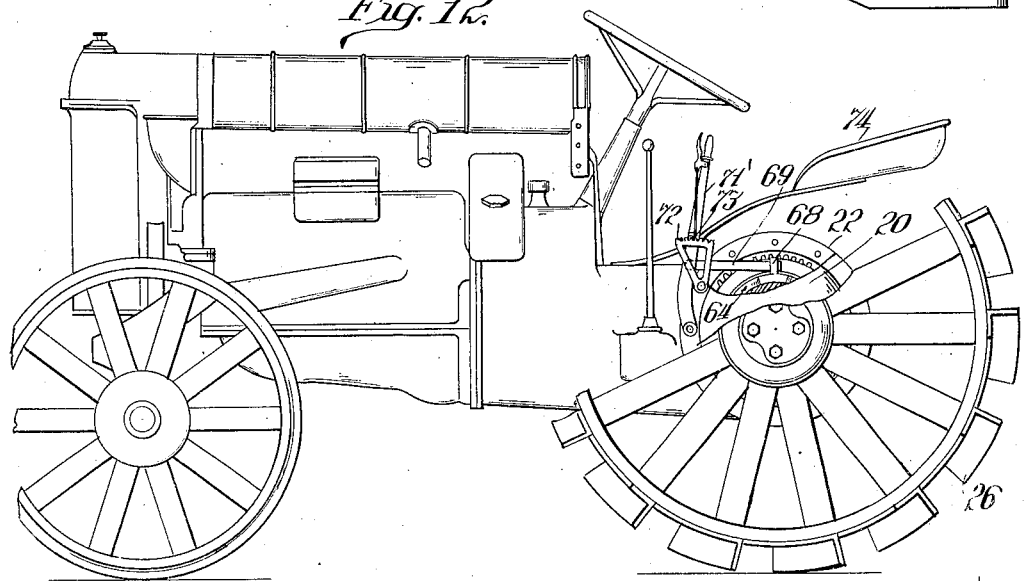

Fig. 6 is a side elevation of the differential housing and differential worm wheel gear, showing one of the thrust spiders mounted on the differential housing, with the hub of the latter and the axle in cross-section;

Fig. 7 is an inner end elevation of one section of the axle housing, showing the stationary cam ring bolted thereto;

Fig. 8 is a perspective view of the thrust spider;

Fig. 9 is a perspective view of the shiftable cam ring which co-operates with the stationary cam ring of Fig. 7 to actuate the thrust spider inwardly;

Fig. 10 is a detail view, partly in elevation and partly in vertical section, illustrating the power take-off device on the propeller shaft;

Figs. 11 and 12 are top plan and side elevation outline views, respectively, of a tractor equipped with the present invention, showing manually operable means for actuating the clutch throw-outs from the driver's seat;

Figs. 13 and 14 are fragmentary top plan and side elevation views respectively of the rear portion of a tractor showing a throw-out actuating mechanism connected to and operated from the steering post.

I have herein illustrated an embodiment of the invention adaptable for tractors, and equipped with a manually operable clutch throw-out which, as above stated, permits turning on one rear wheel as a pivot; the tractor parts and features illustrated being those of the well-known Fordson tractor, to which my present invention is applicable by simply removing the differential pinions, reshaping the differential spider arms, and inserting laterally shiftable driving clutch members to co-operate with the differential axle gears, and the clutch throw-out mechanism. It is to be understood, however, that the invention is not limited in all respects either to the particular tractor rear axle and differential structure illustrated or to a differential mechanism equipped with a manually operable clutch disengaging or throw-out device.

Referring to the drawings, 20 and 21 designate respectively the hollow tapered end sections of the rear axle housing or bridge, and 22 the intermediate cylindrical section rigidly united to and between the end sections by bolts 23. Extending through the end sections 20 and 21 are the axle sections 24 and 25, on the outer ends of which are keyed the rear wheels 26 and 27 (Fig. 11) of the tractor, and on the inner end portions of which are rotatably mounted the hubs of the mating half sections 28 and 29 of the rotatable differential housing; said housing hubs being supported by anti-friction bearings 30 in and from the inner ends of the axle housing sections 20 and 21, and the differential housing sections 28 and 29 being rigidly clamped by through bolts 31 to the annular web 32 of the master worm wheel gear 33, which latter is driven by a worm 34 (Fig. 10) on the underlying continuous propeller shaft 35.

Keyed fast on the inner ends of the axle sections 24 and 25 are bevel gears 36, 37 which constitute the driven clutch members and, in practice, may also constitute the ordinary axle gears of the standard differential.

As shown in Fig. 2, the inner ends of the axle sections 24 and 25 are preferably formed with central seats 38 for a ball 39 that forms a thrust bearing and spacer between the ends of the axle sections; and loosely encircling said thrust bearing is the hub 40 of a driver spider having a plurality (four as herein shown) of radial arms or spokes 41 (Fig. 3). The outer end portions of said arms or spokes may be round, and the same are rigidly clamped and held in mating sockets on the inner faces of the differential housing sections 28, 29, as clearly shown in Fig. 1. The inner portions of the arms or spokes 41 are pressed, or otherwise formed, into hexagonal form in cross-section, as clearly shown in Figs. 4 and 5, whereby said spider arms present flat inclined cam faces 42 for forward driving and 43 for rearward driving.

Between the driver spider and the driven clutch members 36 and 37 are located a pair of driving clutch members 44 and 45, each of which takes the form of a floating annulus or ring notched on its inner side to provide major cams 46 and 47 for co-operation with the spider cams 42 and 43, respectively, and formed on its outer side with oblique sided teeth 48 constituting minor cams for co-operation with the correspondingly shaped teeth of the axle gears or driven clutch members 36, 37. Compression springs 49 (Fig. 2) located in seats 50 in the inner side of one of the driver clutch members 44 and 45 and abutting against the inner side of the other clutch member normally urge both clutch members into driving engagement with the teeth of the axle gears 36, 37; such engagement being maintained in normal forward or rearward driving by the cam thrust of the spider arms against the major cams 46 and 47. When one wheel tends to overrun the other, as on a curved stretch of roadway, or rounding a corner, the teeth of the axle gears 36 and 37 cam the driving clutch member of the faster running axle inwardly, disengaging the gears, and thus permitting free overrunning of the faster rotating axle and wheel; and by the employment of the cams 42 and 43 on the spider arms co-operating with the major cams 46 and 47 of the driving clutch members, such disengagement can be effected with a minimum amount of lost motion before complete disengagement is effected.

To effect the inward camming of the driving clutch members during overrunning, it is essential to limit the rotary movement thereof relatively to the spider arms so that the rear cams on the latter (with reference to the direction of rotation of the spider arms) will not oppose such inward movement. For this purpose the inner face of each driving clutch member is provided with a pin 50' and, opposite to the latter, an enlarged hole 50ª, the pin 50' on each member entering the hole 50ª on the other so as to thereby limit the extent of relative turning movement between the two driving clutch members.

An important feature of the present invention, and one especially applicable to tractor use, resides in a manually operable throw-out for instantly disengaging the driving and driven clutch members on either side, so as to permit a very short turning movement and, in fact, a turning on one rear wheel as a pivot; and this mechanism will next be described.

Referring to Figs. 1 and 6, on the outer sides of the differential housing sections 28, 29, are mounted studs 51 on which studs is mounted, on each side of the differential housing, a thrust or throw-out spider, this latter comprising a flat ring 52 equipped on its inner periphery with lugs 53 apertured to slide on the studs 51 and also with inwardly directed fingers 54 that extend through holes 55 formed in the housing sections 28 and 29. The inner ends of the fingers 54 are adapted to abut against an annular shoulder 56 formed on the outer side of each of the shiftable clutch members 44 and 45. Each of the thrust spiders is normally pressed outwardly from its co-operating clutch member by thrust springs 57 interposed between the lugs 53 and the opposite side of the differential housing.

Describing next the means for actuating the thrust spiders to disengage the driving clutch members, cast on or attached to the inner face of each of the axle housing sections 20 and 21 is a cam ring 58 shown in face view in Fig. 7. In the instance shown, this cam ring is formed on its outer periphery with a plurality of lugs or ears 59 apertured to receive T-bolts 60 that extend through holes in the annular face of the housing member. On the face of the cam ring 58 are a plurality of low cams 61 sloping in one direction, and a corresponding group of alternately disposed cams 62 sloping in the reverse direction. The cam ring 58 is also formed with a circular inwardly projecting flange 63, on which is rotatably mounted a co-operating shiftable cam ring 64, shown in isolated detail in Fig. 9. On the outer face of the cam ring 64 are formed two groups of alternately arranged oppositely sloping cams 65 and 66 which co-operate with the cams 61 and 62, respectively under turning movements of the cam ring 64 in opposite directions. Between the inner face of each cam ring 64 and the outer face of each thrust spider 52 is interposed an anti-friction thrust bearing 67; the opposed faces of said parts being countersunk to receive and support said bearing. For operative purposes only one set of co-operating cams 61, 65 or 62, 66 is required; but each cam ring is preferably equipped with two sets of oppositely inclined cams for economy of manufacture, since in that case identical cam rings will serve either side of the device.

On the upper side of each shiftable cam ring 64 is a lug 68, to which is pivotally connected the rear end of a forwardly extending link bar 69, this latter passing through a groove 70 (Fig. 7) formed across the annular face of each housing member 20 and 21. A pull spring 71 anchored at one end to the axle housing 20 or 21 and at its opposite end to the shiftable cam ring 64 urges the cam ring backwardly to idle or inoperative position. As shown in Figs. 11 and 12, the forward end of each link 69 is pivotally connected to a manually operable lever 71' equipped with an ordinary segment rack 72 and locking dog 73, within convenient reach of the driver occupying the seat 74.

The operation of the mechanism herein shown and described will be readily understood from the foregoing description of its structural features. During the normal travel of the tractor, the operating levers 71 are in their rear position, and the co-operating cam rings 58 and 64 are idle. When traveling a curved path or turning a corner, wherein the outer wheel and axle overrun the inner wheel and axle, the driving clutch member on the outer side is automatically thrown out of clutch with its co-operating axle gear 36 or 37 by the camming action of the teeth of the latter; the clutch engagement being automatically restored by the springs 49 and the cams 42 of the driver spider co-operating with the major cams 46 of the driving clutch members. This action is generally similar to the automatic throw-out action of the mechanism disclosed in my former patents above referred to; but, by reason of the direct co-operative action of the driver spider cams and the co-operating driving clutch member cams, it takes place more quickly and with less lost motion than in the constructions disclosed in my said former patents.

When the tractor is at work, as in dragging a gang plow, by the use of the manually operated clutch throw-out it is possible to make a very short turn, practically on one rear wheel as a pivot. If the turn is to the right, the right hand lever 71 is thrown forwardly, thereby through the cam rings and thrust spider on that side, instantly disengaging the driving and driven clutch members, so that no rotative effort is imparted to the rear wheel on that side, the entire rotative effort being then transmitted to the left hand wheel, which may then move substantially on the arc of a circle of which the tangent point of the right hand wheel on the ground is the center and the rear axle is the radius. Manifestly, the capacity of the apparatus to effect turning movements of this character is a great advantage when the tractor is employed in agricultural operations. It may also be noted that the co-operating cam rings may be arranged in such relation to each other that the oppositely inclined cams thereon will co-operate, in which case the hand levers will be drawn rearwardly to disengage the shiftable clutch members.

The provision of manually operated clutch disengaging members on both sides of the differential also makes it practicable to employ the propeller shaft 35 as a power take-off when desired while the tractor is standing still. In Fig. 10 I have illustrated a simple and practical device for this purpose. Referring thereto, 75 designates the threaded rear end of the propeller shaft 35, to which is attached a power shaft 76 carrying a pulley 77; the shaft 76 being supported and journaled in a bearing 78 carried by an auxiliary housing 79 that is attached by bolts 80 to the rear end of the lower portion of the central section 22 of the axle housing. The shaft 35, just in rear of its connection to the power shaft 76 is provided with a pair of oppositely acting anti-friction thrust bearings 81 and 82; this feature, however, being old and known. Where it may be desired to employ the tractor motor as a source of power for another machine, such as a threshing machine, all that is necessary is to disconnect the differential clutches on both sides by forward shift of the two levers 71; the only idly driven parts then being the master worm gear and the driving clutch members. Since tractors are commonly equipped with variable speed transmission providing three speeds forward and one reverse, all of which operate through the propeller shaft, the axle sections and the wheels, the advantage of taking the power from the propeller shaft, in combination with the wheel driving throw-out mechanism will be evident. It may here be noted that the driving clutch members are sufficiently narrow, relatively to the width of the space between the two fixed driven clutch members, to permit simultaneous disengagement of both of said driving clutch members from their respective driven clutch members; this feature permitting the propeller shaft to rotate without transmitting any power to either of the traction wheels of the tractor.

In Figs. 13 and 14 I illustrate a simple mechanism for actuating the clutch throw-outs by and from the steering post under the turning movements of the latter. 83 designates the steering post equipped with the usual hand wheel 84. On opposite sides of said post are short arms 85 to which are pivoted the inner ends of a pair of laterally extending levers 86 longitudinally slotted to engage with fulcrum pins 87 mounted in brackets 88. The outer ends of the levers 86 extend through longitudinal slots 89 in links 90 that are pivoted at their rear ends to the upper ends of vertical levers 91, to which latter are connected the forward ends of the link bars 69. By this means, when the steering post is turned right or left, the clutch throw-out on the side to which the wheel is turned is simultaneously operated, and the clutch throw-out on the opposite side remains neutral.

In vehicles equipped with the standard or so-called "equalizing" differential, it is possible, by locking one wheel to the ground, to raise the opposite wheel and use it, or a pulley or gear substituted for it, as a power take-off device by belting or gearing it to some machine to be thus driven by the vehicle motor, and this has been done. But in such a case the speed of the power take-off is necessarily doubled and the effective leverage consequently halved. In the mechanism of my present invention, either rear wheel can thus be used as a power take-off device by simply disconnecting the drive from the differential to the other wheel, preserving what I may call a 1 to 1 ratio of the power to the load, and avoiding the mechanical disadvantage of doubling the speed and halving the transmitted power.

It is believed that the structural features, mode or principle of action, and practical advantages of the invention will be clear to persons skilled in the art from the foregoing description without further elaboration; and while I have herein shown and described one practical embodiment of the invention, as adapted for application to tractors, it is manifest that the operative principle thereof may be embodied in other more or less specifically different forms, and that features of the invention may be usefully employed without the manual clutch disengaging mechanism. Hence I do not limit the invention to the particular embodiment herein disclosed, but reserve all such variations and modifications as fall within the spirit and purview of the appended claims.

I claim—

1. In a differential mechanism, the combination of a rotatable differential housing, axle sections entered within the opposite ends of said housing, driven clutch members fast on said axle sections, laterally shiftable driving clutch members between said driven members, a driver connected to said housing and having portions thereof drivingly engaged with said shiftable members, and means for throwing said driving clutch members out of engagement with said driven clutch members.

2. In a differential mechanism, the combination of a rotatable differential housing, axle sections entered within the opposite ends of said housing, driven clutch members fast on said axle sections, laterally shiftable driving clutch members between said driven members, cams on the inner sides of said driving clutch members, a driver connected to said housing, cams on said driver co-operating with the cams on said driving clutch members to both rotate the latter and hold the same engaged with said driven clutch members, and means for disengaging said driving clutch members from said driven clutch members.

3. In a differential mechanism, the combination of a rotatable differential housing having apertured sides, axle sections entered within the opposite ends of said housing, driven clutch members fast on said axle sections, laterally shiftable driving clutch members between said driven members, a driver connected to said housing and having portions thereof drivingly engaged with said shiftable members, laterally shiftable thrust spiders encircling the side walls of said differential housing having fingers extending through the apertures of the latter in thrust engagement with said driving clutch members, springs normally retracting said thrust spiders, and means for forcing said thrust spiders inwardly whereby to disengage said driving clutch members from said driven clutch members.

4. In a differential mechanism, the combination of an axle housing, a rotatable differential housing within said axle housing having apertured sides, axle sections in said axle housing having their inner ends entered within the opposite ends of said differential housing, driven clutch members fast on said axle sections within said differential housing, laterally shiftable driving clutch members between said driven members, a driver connected to said differential housing and having portions thereof drivingly engaged with said shiftable members, laterally shiftable thrust spiders slidably mounted on the side walls of said differential housing and formed with fingers extending through the apertures of the latter in thrust engagement with said driving clutch members, springs normally retracting said thrust spiders, fixed cam rings on said axle housing, co-operating rotatable cam rings between said fixed cam rings and said thrust spiders, and means for turning said rotatable cam rings.

5. In a differential mechanism, the combination of an axle housing, a rotatable differential housing within said axle housing having apertured sides, axle sections in said axle housing having their inner ends entered within the opposite ends of said differential housing, driven clutch members fast on said axle sections within said differential housing, laterally shiftable driving clutch members between said driven members, a driver connected to said differential housing and having portions thereof drivingly engaged with said shiftable members, laterally shiftable thrust spiders slidably mounted on the side walls of said differential housing and formed with fingers extending through the apertures of the latter in thrust engagement with said driving clutch members, springs normally retracting said thrust spiders, fixed cam rings on said axle housing, co-operating rotatable cam rings between said fixed cam rings and said thrust spiders, anti-friction thrust bearings between said rotatable cam rings and said thrust spiders, springs normally retracting said rotatable cam rings to idle position, pull links connected to said cam rings and extending through said axle housing, and levers connected to and actuating said links.

FRANK M. LEWIS.